US006526843B1

(12) United States Patent
Ross et al.

(10) Patent No.: US 6,526,843 B1
(45) Date of Patent: Mar. 4, 2003

(54) COMBINED DETENT AND NEUTRAL SWITCH MECHANISM

(75) Inventors: Christopher B. Ross, Pinehurst, NC (US); Patrick L. Scheib, Pinehurst, NC (US); Kenneth T. Picone, Pinehurst, NC (US); Michael K. Humphrey, West End, NC (US)

(73) Assignee: ZF Meritor, LLC, Maxton, NC (US)

( * ) Notice: Subject to any disclaimer, the term of this patent is extended or adjusted under 35 U.S.C. 154(b) by 0 days.

(21) Appl. No.: 09/708,317

(22) Filed: Nov. 8, 2000

(51) Int. Cl.$^7$ ............................ B60K 20/00; G05G 5/00
(52) U.S. Cl. .................. 74/473.28; 200/61.91; 74/335
(58) Field of Search ................... 74/473.28, 335; 477/99; 200/61.91

(56) References Cited

U.S. PATENT DOCUMENTS

| | | | | |
|---|---|---|---|---|
| 3,581,594 A | * | 6/1971 | Longshore | 74/473.26 |
| 3,943,792 A | * | 3/1976 | Sibeud | 74/473.1 |
| 4,415,786 A | * | 11/1983 | Takada et al. | 200/61.91 |
| 4,491,039 A | * | 1/1985 | Benedek et al. | 477/99 |
| 5,031,472 A | * | 7/1991 | Dutson et al. | 74/335 |
| 5,468,197 A | * | 11/1995 | Loeefler | 477/99 |

* cited by examiner

*Primary Examiner*—David A. Bucci
*Assistant Examiner*—Justin Stefanon
(74) *Attorney, Agent, or Firm*—Carlson, Gaskey & Olds

(57) ABSTRACT

The detent and neutral switch mechanism includes a roller detent pin attached to a roller spring. The detent pin engages contoured shift fork extensions and resists movement of the shift fork extensions when gears are shifted and creates a "shift feel." A neutral switch positioned above the roller spring indicates when the transmission is in neutral. When the transmission is in neutral, the deep neutral detent notches on the shift fork extensions are aligned, lowering the detent pin and disengaging the roller spring from the position switch, indicating the transmission is in neutral and that it is safe to make a shift. When the transmission is in gear or in the process of making a shift, the detent pin engages raised in-gear notches or detent peaks, respectively, engaging the roller spring with the position switch indicating that the transmission is not in neutral.

20 Claims, 4 Drawing Sheets

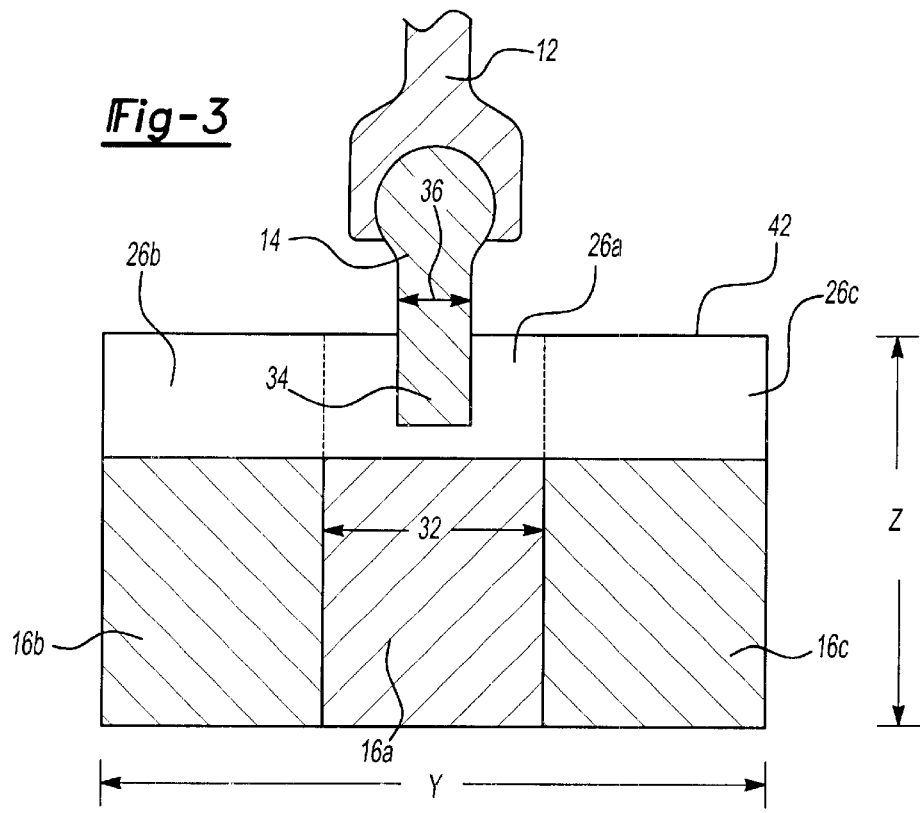
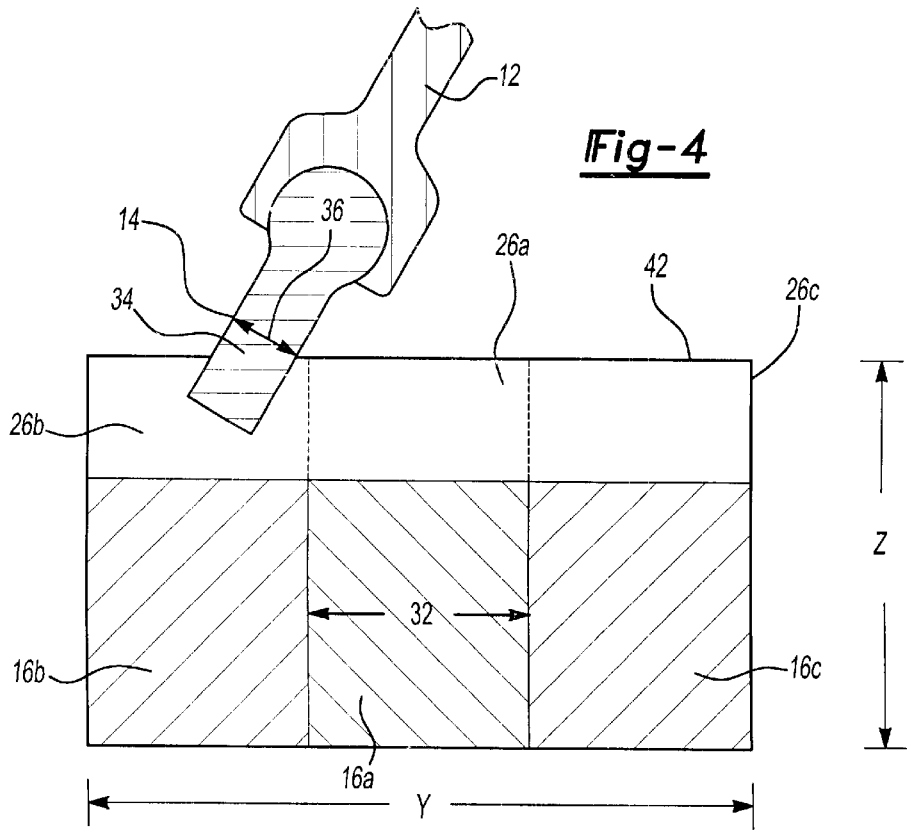

COMBINED DETENT AND NEUTRAL SWITCH MECHANISM

BACKGROUND OF THE INVENTION

The present invention relates generally to a combined detent and neutral switch mechanism for use in a manually controlled transmission.

As the vehicle operator moves a shift lever though the shift pattern, the shift lever moves an operatively connected shift fork extension. The moving shift fork extension in turn selectively engages a shift fork which moves clutch collars into engagement with a gear, causing a gear shift.

Prior art manual transmissions assemblies utilize both detent mechanisms and neutral switches, which are separate components within the manual transmission. A detent mechanism provides feedback, or a shift feel, to indicate to the vehicle operator where he is in the shift pattern. As a shift fork extension is moved during a shift, a detent pin coacts with a contoured surface in the shift fork extension and provides resistance to the movement of the shift fork extensions.

When shifting gears in a manual transmission assembly, only one shift fork extension can move at a time. It is therefore desirable that the shift fork extensions, and the transmission, be in the neutral position when a shift occurs. A neutral switch is used to provide feedback that the transmission is in neutral. The separate detent and neutral switch mechanisms require additional parts to assemble the manual transmission. Therefore, undue time is needed to assemble and repair the transmission.

Hence, there is a need in the art for a combined detent and neutral switch mechanism for use in a manually controlled transmission.

SUMMARY OF THE INVENTION

The present invention relates to a combined detent and neutral switch mechanism for use with a manually controlled transmission.

A manual transmission includes a plurality of shift fork extensions. Each shift fork extension has a neutral detent notch and at least one in-gear detent notch, with detent peaks positioned therebetween. When the transmission is in the neutral position, all the neutral detent notches are aligned.

The combined detent and neutral switch mechanism includes a roller detent pin attached to a roller spring. When the transmission is put into gear, the selected shift fork extension translates and the detent pin engages the in-gear detent notch corresponding to the selected gear to resiliently maintain the shift fork extension into the desired in-gear position.

The neutral detent notches, in-gear detent notches, and detent peaks are all formed to different depths. The neutral detent notches are formed to the deepest depth, the detent peaks are formed to the shallowest depth, and the in-gear detent notches are formed to an intermediate depth. As the detent pin travels over the contoured surfaces of the shift fork extension, the detent pin biases the roller spring upwardly and downwardly to resist the movement of the shift fork extension and create a "shift feel."

The combined detent and neutral switch mechanism also includes a neutral position switch to indicate when the manual transmission is in neutral. As the selected shift fork extension is translated, the detent pin attached to the roller spring moves in an upwardly and downwardly direction.

When the detent pin is located in an in-gear detent notch or on a detent peak, more upward force is applied to the roller spring and the roller spring contacts the position switch. This indicates either that the transmission is in a gear or that a shift is in progress. If all of the neutral detent notches are aligned (the transmission is in neutral) the detent pin lowers into the aligned neutral detent notches, and the roller spring disengages from the position switch, indicating that the transmission is in neutral and that it is safe to make a gear shift, or the switch could be reversed such that it is only engaged when the transmission is in neutral.

Accordingly, the present invention provides a combined detent and neutral switch mechanism for use in a manually controlled transmission These and other features of the present invention will be best understood from the following specification and drawings.

BRIEF DESCRIPTION OF THE DRAWINGS

The various features and advantages of the invention will become apparent to those skilled in the art from the following detailed description of the currently preferred embodiment. The drawings that accompany the detailed description can be briefly described as follows:

FIG. 3 illustrates a front cross sectional view of a manually operated transmission with the shift lever positioned to translate the inner shift fork extension.

FIG. 4 illustrates a front cross sectional view of a manually operated transmission with the shift lever positioned to translate an outer shift fork extension.

DETAILED DESCRIPTION OF THE PREFERRED EMBODIMENT

Figure 1:
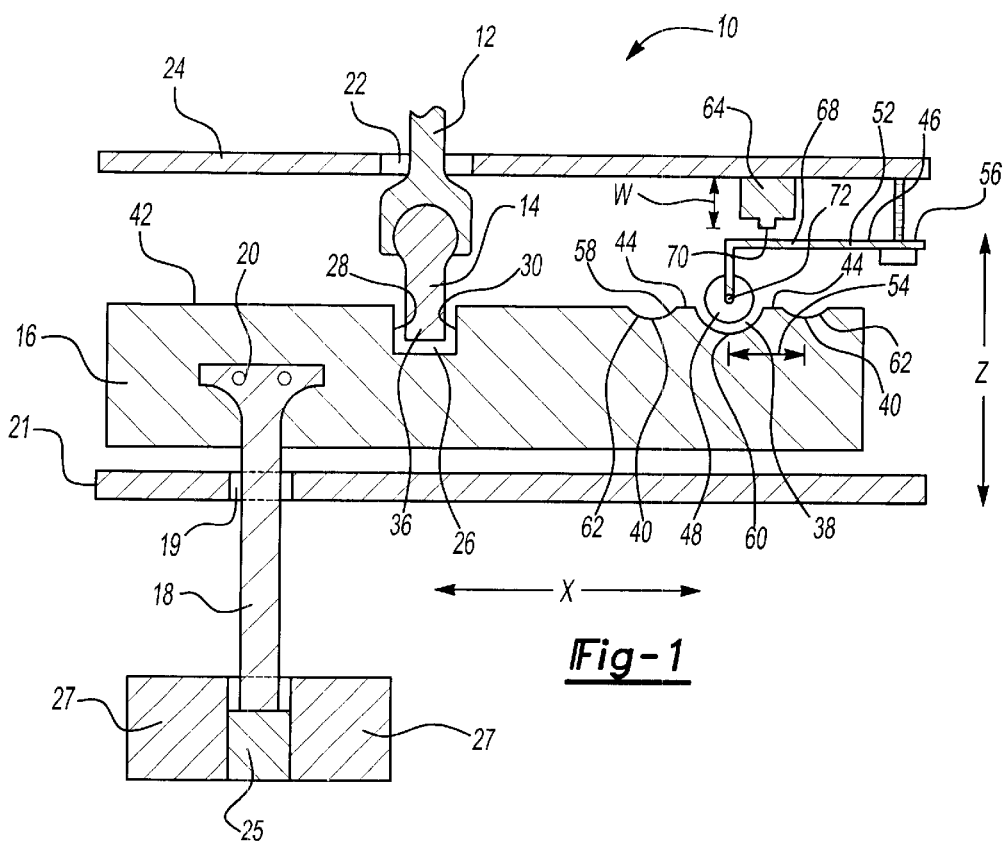
FIG. 1 illustrates a sectional side view of a manually operated transmission utilizing the combined detent and switch mechanism of the present invention.

While the invention may be susceptible to embodiments in different forms, there is shown in the drawings, and herein will be described in detail, specific embodiments with the understanding that the present disclosure is to be considered an exemplification of the principles of the invention, and is not intended to limit the invention to that as illustrated and described herein.

As shown in FIG. 1, the manual transmission 10 includes a shift lever 12, a shift finger 14, and a plurality of shift fork extensions 16, only one of which is shown. The shift lever 12 operatively translates an axially moveable shift fork extension 16, each shift fork extension 16 carrying a perpendicularly attached shift fork 18 which operatively moves gears 27 to cause a gear shift. The shift fork 18 can be attached to the shift fork extension by any means, such as shown at 20. The shift fork 18 further includes a bore 19 through which a shift rail 21 passes to support the shift fork 18 in the manual transmission 10. The shift rail 21 is parallel to the shift fork extensions 16 and is also perpendicular to the shift forks 18. The shift lever 12 extends through an aperture 22 in the top cover 24 of the manual transmission 10, the top cover 24 supporting the transmission components and defining the shift pattern. As the shift lever 12 moves, it operatively translates a selected shift fork extension 16, which moves an attached shift fork 18. The shift fork 18 engages and selectively moves a clutch collar 25 into engagement with one of the gears 27, causing a gear shift.

Figure 2:
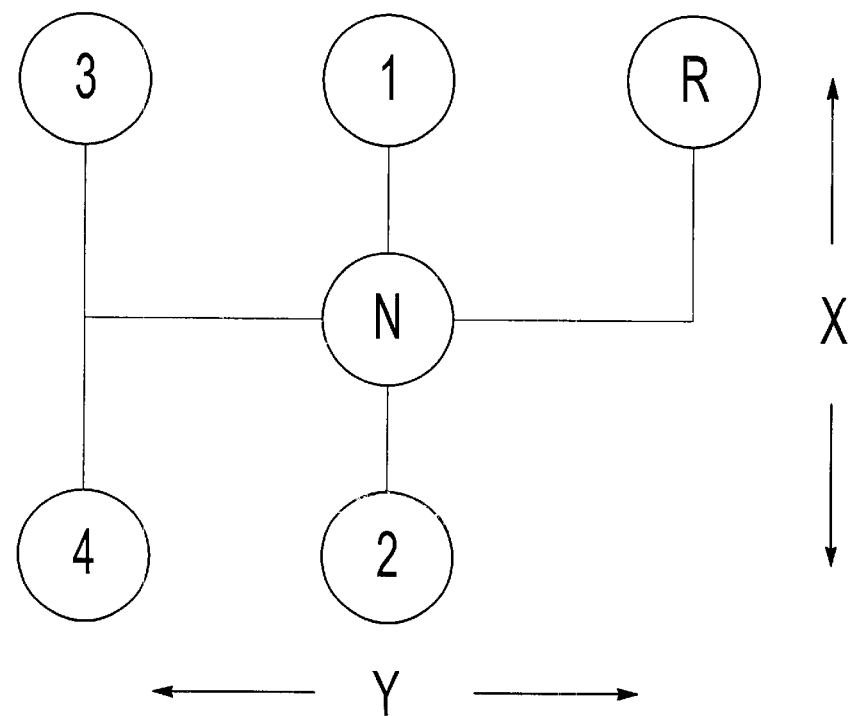
FIG. 2 illustrates a schematic illustration of the shift pattern of the present invention.

As the shift lever 12 is pivoted forwardly along the X axis, the shift finger 14 engages the rear wall 30 of a shift finger notch 26 formed in the shift fork extension 16, translating the shift fork extension 16 rearwardly along axis X. Conversely, as the shift lever 12 is pivoted rearwardly, the shift finger 14 engages the front wall 28 of the shift finger notch 26, translating the shift fork extension forwardly along axis X. When the shift lever 12 is moved from side to side along axis Y as shown in FIGS. 3 and 4, the shift finger 14 pivots and engages a different shift finger notch 26 of a different shift fork extension 16. The shift pattern of the shift lever 12 is illustrated in FIG. 2.

The manual transmission 10 shifts, or engages gears, by the axial movement of the selected shift fork extension 16 along the axis X from the neutral position. Each shift fork extension 16 has a shift finger notch 26 which extends the entire width 32 of the shift fork extension 16 (as shown in FIGS. 3 and 4) and has a front wall 28 and a rear wall 30 which are engageable by the shift finger 14 to translate the shift fork extension 16 along the X axis either in the forward or rearward direction. When the shift fork extensions 16 are all aligned in the neutral position, the shift finger notches 26 of the shift fork extension 16 are also aligned.

As shown in FIGS. 3 and 4, the shift finger 14 has an engageable portion 34 which has a width 36 slightly less than the width 32 of the shift fork extensions 16, which allows the shift finger 14 to engage only one shift fork extension 16 at a time. The shift lever 12 is pivoted along the Y axis so that the engageable portion 34 of the shift finger 14 is in the shift finger notch 26 of the selected shift fork extension 16. Thus, the shift lever 12 is pivotable in both the X direction and Y directions. Once the shift lever 12 is pivoted in the Y direction so that the engageable portion 34 of the shift finger 14 is aligned with the selected shift fork extension 16, the shift lever 12 can then pivoted in either the forward or reverse direction along the X axis to translate the shift fork extension 16 and to select the desired gear.

Figure 5:
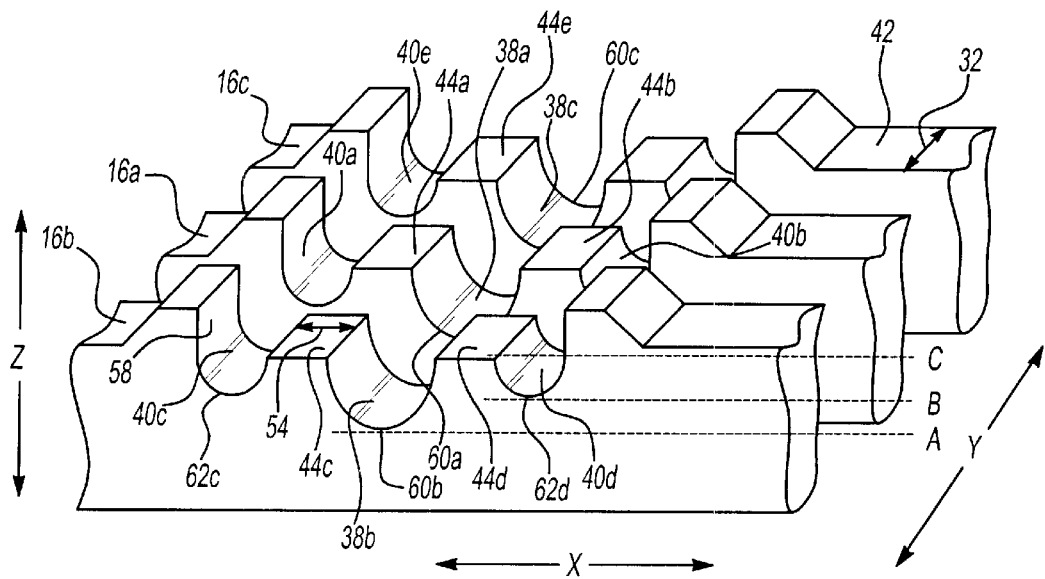
FIG. 5 illustrates a perspective view of the shift fork extensions showing the neutral detent notches, the in-gear detent notches, and the detent peaks.

In this embodiment, the manual transmission utilizes three shift fork extensions 16a, 16b, and 16c, as shown in FIG. 5. Although three shift fork extensions 16a, 16b, and 16c are illustrated in this embodiment, other numbers of shift fork extensions are possible depending on the number of gears. In this embodiment, the three shift fork extensions 16a, 16b, and 16c provide four forward speeds and one reverse speed. Shift fork extension 16a is the inner shift fork extension 16 which operates the first speed and the second speed. Shift fork extension 16b is the outer left shift fork extension which operates the third speed and the fourth speed. Shift fork extension 16c is the outer right shift fork extensions which operates the reverse speed. Each shift fork extension 16 carries a shift fork 18 which operatively engages and shift gears 27 to cause a gear shift.

Returning to FIG. 1, each shift fork extension 16 has a central neutral detent notch 38 and at least one in-gear detent notch 40 carved into the upper surface 42 of each shift fork extension 16. Detent peaks 44 are positioned therebetween. The in-gear detent notches 40 are spaced proximate to the neutral detent notches 38. The neutral detent notches 38 and the in-gear detent notches 40 both extend the entire width 32 of the shift fork extension 16. When the shift fork extensions 16 are in the neutral position, all of the neutral detent notches 38 are aligned. The in-gear detent notches 40 are spaced apart from the neutral detent notches 38 so that when a selected shift fork extension 16 is positioned in gear, the corresponding in-gear detent notch 40 aligns with the neutral detent notches 38 of the other shift fork extensions 16. FIG. 5 illustrates the shift finger extensions 16a, 16b, 16c, the neutral detent notches 38a, 38b, 38c, the in-gear detent notches 40a, 40b, 40c, 40d, 40e, and the detent peaks 44a, 44b, 44c, 44d, 44e of the present invention.

Figure 6:
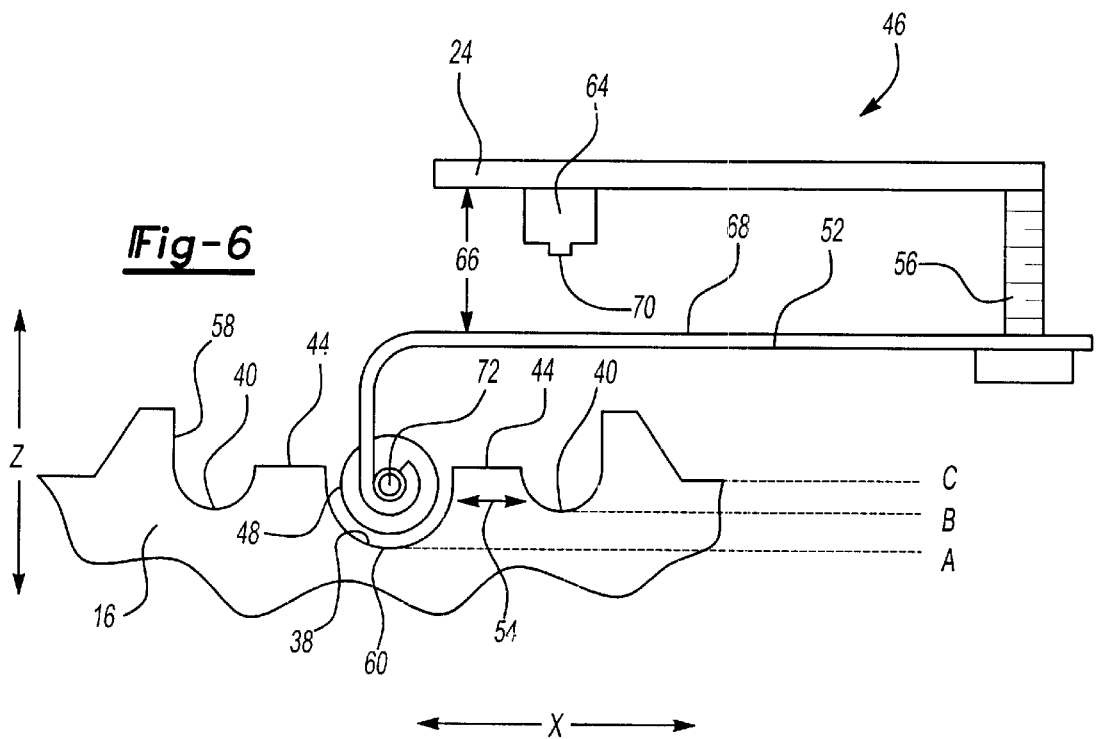
FIG. 6 illustrates a side view of the combined detent and neutral switch mechanism coacting with the neutral detent notch of a shift fork extension.

FIG. 6 illustrates the combined detent and neutral switch mechanism 46 of the present invention coacting with a shift finger extension 16. The detent and neutral switch mechanism 46 includes a cylindrical roller detent pin 48 which engages the detent peaks 44, neutral detent notches 38, and in-gear detent notches 40 of the shift fork extensions 16. The length of the detent pin 48 is greater than or equal to the combined widths 32 of the shift fork extensions 16. The combined detent and neutral switch mechanism 46 also includes a roller spring 52 which allows upward and downward movement of the detent pin 48 along the Z axis.

The detent pin 48 engages the neutral detent notches 38 of the shift fork extensions 16, when the transmission 10 is in neutral. When the transmission 10 is put into gear, the desired shift fork extension 16 translates along the X axis to an in-gear position, and the detent pin 48 will engage the in-gear detent notch 40 corresponding to the selected gear. The detent pin 48 engages the in-gear detent notch 40 to resiliently maintain the shift fork extension 16 into the desired in-gear position.

Each neutral detent notch 38 is formed to a depth A. The in-gear detent notches 40 are all formed to a depth shallower than the depth of the neutral detent notches 38, represented by a depth B. The detent peaks 44 are all formed to the shallowest depth, represented by a depth C. As shown in FIG. 5, the middle shift fork extension 16a has a neutral detent notch 38a positioned between a first in-gear detent notch 40a and a second in-gear detent notch 40b. The left shift fork extension 16b has a neutral detent notch 38b positioned between a third in-gear detent notch 40c and a fourth in-gear detent notch 40d. The right shift fork extension 16c has a neutral detent notch 38c and a reverse in-gear detent notch 40e.

When the manual transmission 10 is in neutral, the detent pin 48 engages the neutral detent notches 38a, 38b, 38c of all three shift fork extensions 16a, 16b, 16c. When it is desired to place the manual transmission 10 in the first gear, the shift lever 12 is positioned so that the engageable portion 34 of the shift finger 14 engages the shift finger notch 26a of the middle shift fork extension 16a. As the shift lever 12 is moved in the forward direction to engage the first gear, the shift fork extension 16a moves in the rearward direction, aligning the first in-gear detent notch 40a of the shift fork extension 16a with the neutral detent notches 38b, 38c of the other shift fork extensions 16b, 16c. In this position, the detent pin 48 of the combined detent mechanism 46 engages the first in-gear detent notch 40a of the middle shift fork extension 16a and aligns over the neutral detent notches 38b, 38c of the other shift fork extensions 16b, 16c.

When it is desired to place the manual transmission 10 in the second gear, the shift lever 12 is moved in the rearward direction to engage the second gear. The shift fork extension moves in the forward direction, aligning the second in-gear detent notch 40b of the shift fork extension 16a with the neutral detent notches 38b, 38c of the other shift fork extensions 16b, 16c. In this position, the detent pin 48 of the combined detent mechanism 46 engages the second in-gear detent notch 40b of the middle shift fork extension 16a and aligns over the neutral detent notches 38b, 38c of the other shift fork extensions 16b, 16c. When shifting to third gear, fourth gear, or reverse, the same process is repeated for the selected shift fork extension 16.

When a shift is in progress, the detent pin 48 contacts detent peaks 44. A first detent peak 44a is located between the neutral detent notch 38a of the middle shift fork extension 16a and the first in-gear detent notch 40a, and a second detent peak 44b is located between the neutral detent notch 38a and the second in-gear detent notch 40b. Detent peaks 44c, 44d are located on the left shift fork extension 16b between the neutral detent notch 38b, and the third in-gear detent notch 40c and the fourth in-gear detent notch 40d, respectively. Detent peak 44e is located on the right shift fork extension 16c near the neutral detent notch 38c. The length 54 of the detent peaks 44 are equal to the amount of movement needed to shift gears.

The force of the detent pin 48 on the upper surface 42 of the shift fork extensions 16 provides a shift feel to the operator. The detent pin 48 is attached by pins 72 to an elongated roller spring 52, the roller spring 52 being fixedly attached to the top cover 24 by fasteners 56. The detent pin 48 translates up and down along the Z axis as the selected shift fork extension 16 is moved and engages the neutral detent notches 38, the in-gear detent notches 40, and the detent peaks 44, all at different depths, A, B, and C, respectively. As the detent pin 48 travels up one of the side 58 of a neutral detent notch 38 or an in-gear detent notch 40 during a shift, the shift effort increases because the detent pin 48 exerts an upward force on the roller spring in the upwardly Z direction. Once the detent peak 44 is crested and the detent pin 48 engages either the neutral detent notch 38 or another in-gear detent notch 40, the shift effort decreases as the detent pin 48 travels down the side 58 of the notch and the less force is applied to the roller spring 52.

Figure 7:
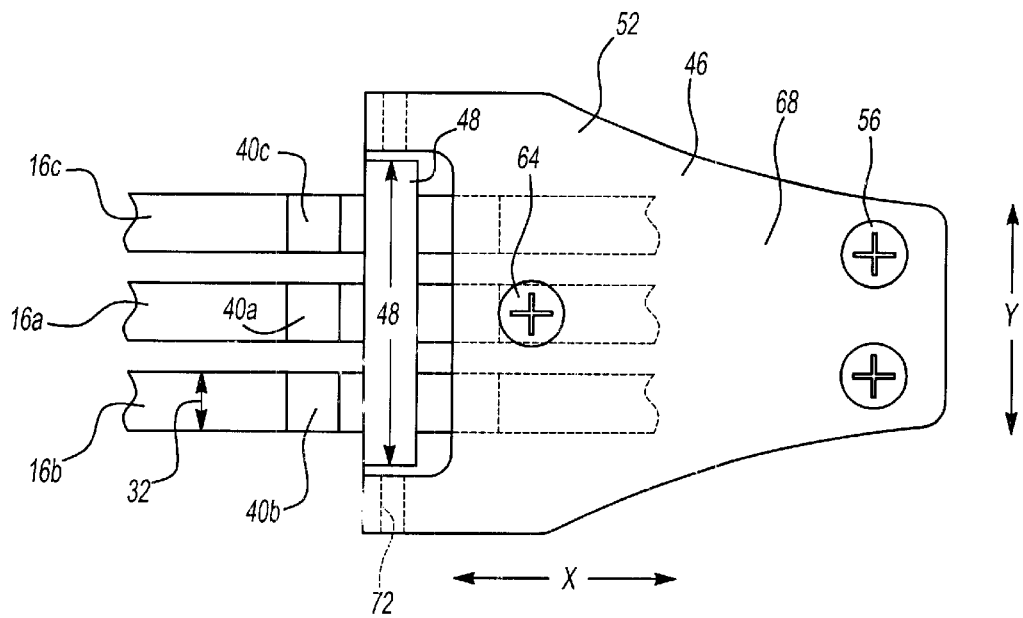
FIG. 7 illustrates a top view of the combined detent and neutral switch mechanism coacting with the shift fork extension.
Figure 8:
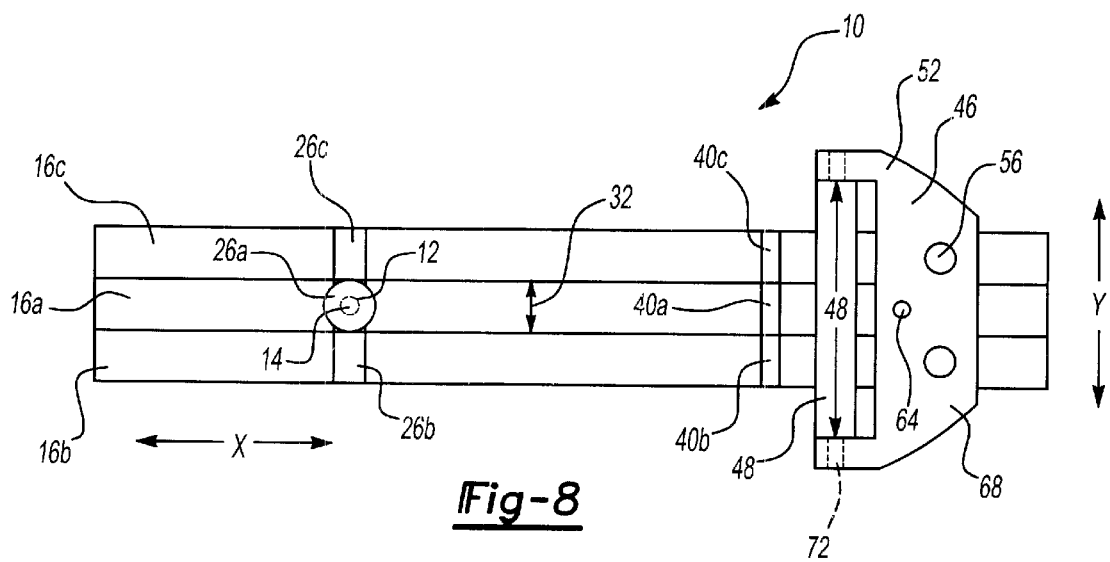
FIG. 8 illustrates a top view of a manually operated transmission utilizing a combined detent and neutral switch mechanism.

The combined detent and neutral switch mechanism 46 also includes a neutral position switch 64 to indicate to a control or to the vehicle operator that the manual transmission 10 is in neutral. The reasons for suing neutral state feedback is known in the art. The neutral position is the position where all of the neutral detent notches 38a, 38b, 38c of the shift fork extensions 16a, 16b, 16c are aligned, as shown in FIGS. 7 and 8.

The neutral detent notches 38 are the deepest, formed such that the bottom 60 of the neutral detent notches 38 are at a depth A along the Z axis. The in-gear detent notches 40 are shallower than the neutral detent notches and are formed such that the bottom 62 of the in-gear detent notches 40 are at a depth B along the Z axis. The detent peaks 44 are the shallowest and are at a depth C along the Z axis.

As the selected shift fork extension 16 is translated along the X axis, the detent pin 48 attached to the roller spring 52 moves in upwardly and downwardly along the Z axis. When the detent pin 48 in positioned in the neutral detent notches 38, the detent pin 48 contacts the bottom 60 of the neutral detent notches 38 at a depth A along the Z axis. In this position, relatively little upward force is applied on the roller spring 52.

When the detent pin 48 in positioned on a detent peak 44, the detent pin 48 contacts the surface of the selected detent peak 44 at a depth C, shallower to depth A. When the detent pin 48 is positioned on a detent peak 44, the greatest amount of force is applied upwardly to the roller spring 52.

When the detent pin 48 is positioned in an in-gear detent notch 40, the detent pin 48 contacts the bottom 62 of the selected in-gear detent notch 40 at a depth B, intermediate to depths A and C, along the Z axis. In this position, the amount of force applied to the roller spring 52 is intermediate to the amount of force applied to the roller spring 52 when the detent pin 48 is located in the neutral detent notches 38 or on a detent peak 44.

When the detent pin 48 is located in an in-gear detent notch 40 or on a detent peak 44, more upward force is applied to the roller spring 52 than the amount of force applied if the detent pin 48 was located in the neutral detent notches 38. A position switch 64 is attached to the top cover 24 and is of a depth 66 such that the upper surface 68 of the roller spring 52 will contact the lower surface 70 of the position switch 64 when the detent pin 48 engages an in-gear detent notch 40 or a detent peak 44.

When the detent pin 48 is located in an in-gear detent notch 40 at a depth B or on a detent peak 44 at a depth C, an amount of upward force is applied to the roller spring 52 such that the upper surface 68 of the roller spring 52 contacts the lower surface 70 of the position switch 64. When the roller spring 52 contacts the position switch 64, either the manual transmission 10 is in a gear or a shift is in progress. Once the transmission 10 is again in neutral, the detent pin 48 is lowered to a depth A in the neutral detent notches 38a, 38b, 38c of all the shift fork extensions 16a, 16b, 16c, and the upper surface 68 of the roller spring 52 disengages from the lower surface 20 of the position switch 64. When the roller spring 52 and the position switch 64 are no longer in contact, the separation of the roller spring 52 and the position switch 64 indicates that the transmission 10 is in neutral.

There are several advantages to combining the detent mechanism and the neutral position switch. For one, by combining the detent mechanism and the neutral switch, fewer parts are needed in the transmission, requiring less assembly time. Additionally, because there are fewer parts, repairs will be easier and require less time.

Accordingly, the present invention provides a combined detent and neutral switch mechanism for use in a manual transmission assembly The foregoing description is only exemplary of the principles of the invention. Many modifications and variations of the present invention are possible in light of the above teachings. The preferred embodiments of this invention have been disclosed, however, so that one of ordinary skill in the art would recognize that certain modifications would come within the scope of this invention. It is, therefore, to be understood that within the scope of the appended claims, the invention may be practiced otherwise than as specially described. For that reason the following claims should be studied to determine the true scope and content of this invention.

What is claimed is:

1. A combined detent and neutral switch mechanism for use with a manual transmission assembly comprising:
   a detent mechanism including an arm having a first end and a detent pin coacting with a contoured surface of a plurality of axially moveable parallel shift fork extensions, said detent pin attached to said first end of said arm, wherein said contoured surface of each of said plurality of axially moveable parallel shift fork extensions further comprises a neutral detent notch with a high depth, an at least one in-gear detent notch with an intermediate depth, and an at least one planar detent peak positioned therebetween with a low depth; and a neutral switch to indicate when said manual transmission is in a neutral position, said arm being in a first position when said manual transmission is in said neutral position and said arm being in a second position when said manual transmission is in a non-neutral position, and said arm actuating said neutral switch between said first position and said second position such that said neutral switch provides feedback of a neutral state.

2. The combined detent and neutral switch mechanism as recited in claim 1 wherein said neutral detent notches located on said contoured surface of each of said plurality of shift fork extensions are aligned in said neutral position.

3. The combined detent and neutral switch mechanism as recited in claim 2 wherein said detent pin engages said aligned neutral detent notches, and said arm does not engage said neutral switch in said neutral position, said neutral switch indicating said neutral position.

4. The combined detent and neutral switch mechanism as recited in claim 2 wherein said detent pin engages said at least one in-gear notch or said at least one detent peak, and said arm engages said neutral switch in said non-neutral position, said neutral switch indicating said non-neutral position.

5. The combined detent and neutral switch mechanism as recited in claim 2 wherein said high depth of said neutral detent notches is of sufficient depth to lower said detent pin into said neutral detent notches so that said arm does not engage said neutral switch.

6. The combined detent and neutral switch mechanism as recited in claim 2 wherein said intermediate depth of said in-gear detent notch and said low depth of said planar detent peak is of sufficient depth to raise said detent pin so that said arm engages said neutral switch.

7. The combined detent and neutral switch mechanism as recited in claim 2 wherein said detent pin is substantially cylindrical and has a width sufficient to engage said plurality of said shift fork extensions.

8. The combined detent and neutral switch mechanism as recited in claim 2 wherein said arm is in contact with said neutral switch in said second position, but moves out of engagement when in said first position.

9. The combined detent and neutral switch mechanism as recited in claim 2 wherein said arm is a spring.

10. The combined detent and neutral mechanism as recited in claim 2 wherein said resilient arm is capable of bending about a point of attachment to a top cover.

11. A manual transmission assembly comprising:

a detent mechanism including an arm with a first end and a detent pin attached to said first end of said arm, wherein a contoured surface of each of a plurality of axially moveable parallel shift fork extensions further comprises a neutral detent notch with a high depth, an at least one in-gear detent notch with an intermediate depth, and an at least one planar detent peak positioned therebetween with a low depth;

a neutral switch to indicate when said manual transmission is in a neutral position, said arm being in a first position when said manual transmission is in said neutral position and said arm being in a second position when said manual transmission is in a non-neutral position, and said arm actuating said neutral switch between said first position and said second position such that said neutral switch provides feedback of a neutral state;

a shift lever to operatively move said plurality of axially moveable parallel shift fork extensions;

said plurality of axially moveable parallel shift fork extensions having said contoured surface, said detent pin coacting with said contoured surface of said plurality of axially moveable parallel shift fork extensions a plurality of shift forks, said shift forks corresponding to and engaging said plurality of shift fork extensions; and a plurality of gears operatively connected to said plurality of shift forks.

12. The assembly as recited in claim 11 wherein said neutral detent notches located on said contoured surface of each of said plurality of shift fork extensions are aligned in said neutral position.

13. The assembly as recited in claim 12 wherein said detent pin engages said aligned neutral detent notches, and said arm does not engage said neutral switch in said neutral position, said neutral switch indicating said neutral position.

14. The assembly as recited in claim 12 wherein said detent pin engages said at least one in-gear notch or said at least one detent peak, and said arm engages said neutral switch in said non-neutral position, said neutral switch indicating said non-neutral position.

15. The assembly as recited in claim 12 wherein said high depth of said neutral detent notches is of sufficient depth to lower said detent pin into said neutral detent notches so that said arm does not engage said neutral switch.

16. The assembly as recited in claim 12 wherein said intermediate depth of said in-gear detent notch and said low depth of said planar detent peak is of sufficient depth to raise said detent pin so that said arm engages said neutral switch.

17. The assembly as recited in claim 11 wherein said detent pin is substantially cylindrical and has a width sufficient to engage said plurality of said shift fork extensions.

18. The assembly as recited in claim 11 wherein said arm is in contact with said neutral switch in said second position, but moves out of engagement when in said first position.

19. The assembly as recited in claim 11 wherein said arm is a spring.

20. The assembly as recited in claim 11 wherein said resilient arm is capable of bending at about a point of attachment to a top cover.

* * * * *